Aug. 3, 1954   L. A. STREBLOW   2,685,195
FATIGUE TESTING MACHINE
Filed Feb. 26, 1952   3 Sheets-Sheet 2

INVENTOR.
Lawrence A. Streblow,
BY
Schneider & Dressler,
Attys.

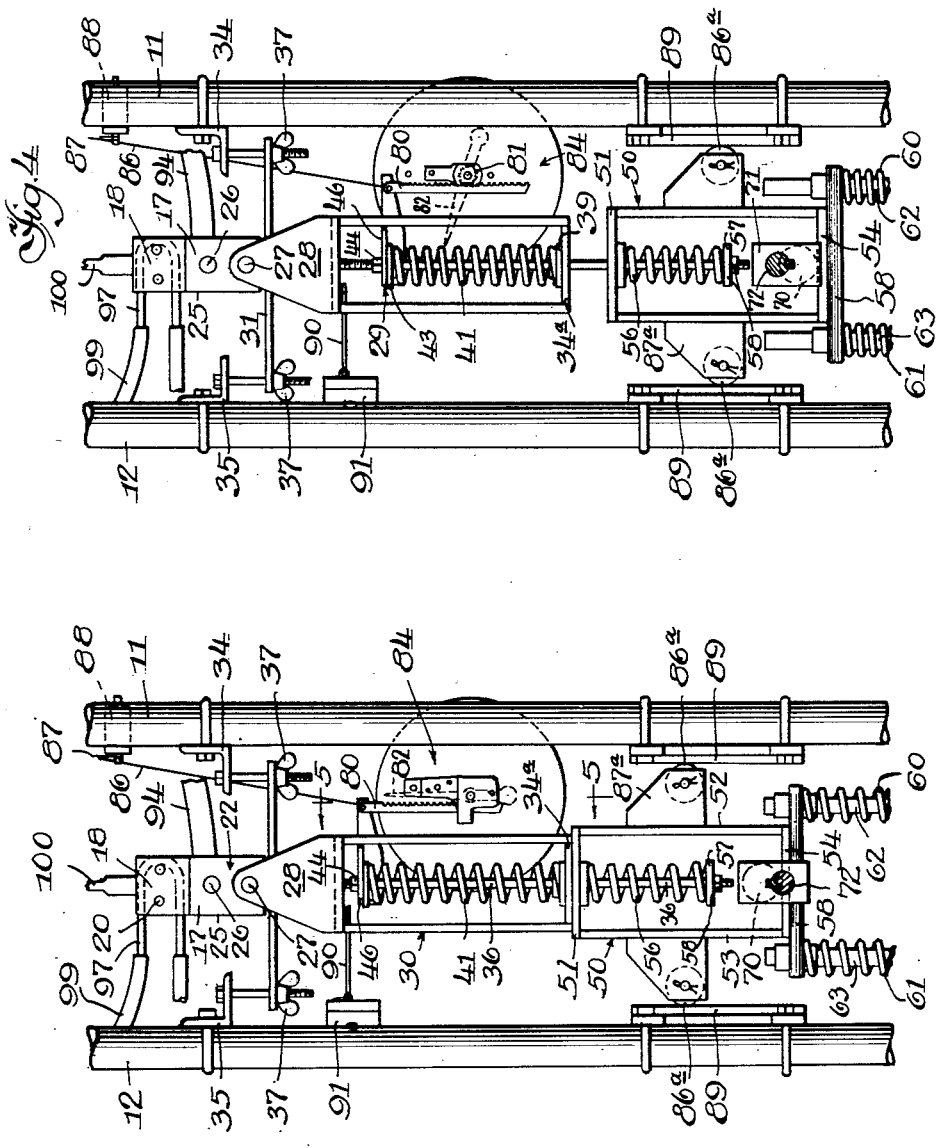

Patented Aug. 3, 1954

2,685,195

UNITED STATES PATENT OFFICE 2,685,195

FATIGUE TESTING MACHINE

Lawrence A. Streblow, Kenosha, Wis., assignor to Fansteel Metallurgical Corporation, a corporation of New York Application February 26, 1952, Serial No. 273,456

7 Claims. (Cl. 73—15.6)

This invention relates to a fatigue testing machine and particularly to a machine for testing specimens for tensile strength under predetermined fatigue conditions.

It is well known that materials which exhibit characterisitcs responses in tensile stresses have different behaviors depending upon the manner in which the stress is applied. Thus, many materials have well-defined tensile stress characteristics when the stress is applied slowly and maintained upon the specimen continuously. However, these same materials may exhibit entirely different response characteristics if the tensile stress is applied suddenly or if the magnitude of the stress is varied cyclically over a period of time. Most materials develop a so-called fatigue characteristic which results in breakdown at stresses.

Many materials and parts using various pieces of mechanism are subjected to cyclic stresses or stresses which vary from zero to a maximum in a short period of time. In the design of such pieces, a knowledge of the fatigue characteristics of the material is of great importance. Not only must a material, of which a part is made, be tested under fatigue conditions but it may even be necessary to test the designed part under fatigue conditions as a check upon the design. Such fatigue conditions not only include the cyclic application of stresses, but also include the application of such stresses to the specimen under controlled temperature conditions.

Machines for testing specimens under fatigue conditions are complicated and, in many instances, the results of the test are questionable. This invention makes it possible to provide a simple mechanism for tensile testing accurately specimens under controlled fatigue conditions.

A machine embodying the present invention relies upon the fact that spring steel is almost perfectly elastic, providing the elastic limit of the steel is not exceeded. Within the limits of elasticity of spring steel, the spring characteristics remain substantially independent of the manner in which stresses are applied to the spring and, within limits, of the cyclic variation of the stress. Thus, the present invention is based upon the fact that Hooke's Law applies accurately to a spring steel member.

In general, a machine embodying the present invention has a calibrated spring steel member arranged to transmit any desired stress upon a sample, and has means for cyclically varying the value of the stress between desired limits at a desired rate. It is understood that the stress limits and rate of application or variation of stress are such that no part of the spring steel member has stresses created therein which exceed the elastic limit of the steel. As the elastic properties of spring steel are widely known and have been thoroughly investigated, anyone skilled in the art may readily determine when the operating limits of the spring steel are approached. For accurate results, it is best to operate the spring steel well within its elastic limits and avoid any close approach to the elastic limit.

The new machine embodying the present invention has means for controlling the stress limits transmitted by the calibrated spring steel member. Additionally, a machine embodying the present invention has means for controlling the temperature of the specimen being tested, and also permits of measurements of such constants as conductivity of electricity in the specimen during testing.

In general, the new testing machine has means for mounting a specimen so that a calibrated spring steel member exerts tension upon the specimen. Cyclic means, whose speed may be controlled, are provided for varying the value of the tensile stress applied to the specimen, the variation ranging from a maximum value down to a zero value. Means are also provided for heating the specimen to any desired temperature during test.

In order that the invention may be understood, an exemplary embodiment of the invention will now be explained in connection with the drawings, it being understood, however, that substantial variations in construction and detail may be made without departing from the spirit of the invention.

Referring, therefore, to the drawings:

Figure 3 is a detail of a portion of the machine shown in Figure 1, when the parts are in position for zero tension on the specimen under test;

Figure 4 is a view similar to Figure 3 but showing the machine in a different position, where maximum tension upon the specimen is provided;

The machine comprises base 10 upon which the various parts are suitably attached or bolted for support. Base 10 is preferably of steel although it may be of concrete, wood, or other material, and has sufficient strength for supporting the various parts of the machine under operating conditions.

Extending upwardly from base 10 are columns 11 and 12. These columns are preferably of steel and may have any desired shape and dimension. Columns 11 and 12 may be attached to base 10 in any suitable fashion, as by bolts or rivets as shown. The tops of the columns are maintained rigidly in predetermined relation by transverse member 14. Centrally of member 14 is supporting block 16 to which one end of the specimen under test is normally attached. Supporting block 16 is preferably of metal and may consist of a massive block of copper, aluminum, or any other metal. Copper is preferred because of its excellent heat and electrical conductivity. As will be shown later, it may be desirable to transmit heating current through the specimen under test.

When electric current is passing through the specimen, the potential of block 16 is above ground and accordingly, it is necessary to insulate this block from the frame as a whole. Accordingly, member 14, extending across columns 11 and 12, may consist of insulating material such as "transite," or may consist of steel insulated from block 16 or from columns 11 and 12, or from both. Thus, for example, since many insulators have excellent compression characteristics, suitable sheets of insulating material, such as "bakelite," glass or the like, may be interposed between the tops of columns 11 and 12 and the opposed parts of member 14. Insulating bushings for the bolts for maintaining the parts in position may also be provided. Inasmuch as the electrical insulation of one part of a machine from another part of a machine is well known and is widely used, various means for insulatingly mounting block 16 with respect to columns 11 and 12 will occur to those skilled in the art.

Figure 6:
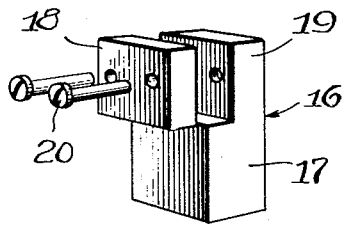
Figure 6 is a perspective detail of the clamping block for retaining an end of a specimen.

Block 16 itself is made in two parts and generally resembles a vise. Thus, referring to Figure 6, for example, it will be seen that block 16 generally consists of massive base member 17 and movable block 18 cooperating with part 19 of the block. Bolts 20, passing through apertures in movable block 18 and engaging threaded apertures in part 19, may be used for drawing the parts together. The specimen may thus be rigidly clamped between the two parts of the block.

Disposed vertically below block 16 is a companion block 22, which is generally similar to block 16 in construction. Block 22 is rigidly clamped between a pair of flat plates 24 and 25 (Figure 2), these plates being either of metal or of insulating material, in case it is desired to insulate block 22 from the machine. If these plates are of insulating material, it will be necessary to design the plates with regard to the nature of material and dimensions so that there will be no question of the ability of these plates to transmit the stresses to be impressed upon the specimen under test.

Plates 24 and 25 are maintained in predetermined position by bolts 26 and 27. Bolt 26 passes through plates 24 and 25 and also passes through the lower portion of block 22. Bolt 27 passes through insulating plates 24 and 25 and yoke 28 of guide frame 30, preferably of steel. Between the plates, forming yoke 28 of guide frame 30, and below bolt 27 is bar 31 of steel or other material, extending outwardly toward columns 11 and 12. Bar 31 is loose and has its ends apertured to accommodate bolts 32 and 33 respectively. Bolt 32 is carried by bracket 34 on column 11, while bolt 33 is similarly carried by bracket 35 on column 12. Brackets 34 and 35 are arranged so that they may be adjusted vertically with respect to the columns and tightened in position. Bolts 32 and 33 have wing nuts 37 threaded over them below bar 31. As is evident from Figure 1, in case of a failure of the specimen, bar 31 will cooperate with the wing nuts to limit the drop of block 22 and all the mechanism movable therewith.

Yoke 29 forms the top end of guide frame 30 consisting of vertical members 32 and 33 and bottom member 34a. Bottom member 34a is apertured to accommodate elongated threaded rod 36 passing longitudinally of the frame. Washer 39 is shaped as shown to provide a central boss for engaging the end coil or coils of spring 41. The coil spring is calibrated so that the strain and stress relationships are known accurately. Usually, such springs are calibrated by determining the amount of force required to compress the spring to accomplish a unit percentage reduction in unstressed length thereof.

The top end of coil spring 41 rests against nut member 43 having a central boss similar to washer 39. Nut member 43 engages rod 36 at a threaded part thereof. Above nut member 43 is lock nut 44 and between the lock nut and the nut member is clamped bracket 46. Bracket 46 is connected to a spring scale and also to a counting mechanism, both of these to be described later.

Vertically aligned with guide frame 30 and disposed below it is a second guide frame 50 consisting of top portion 51, sides 52 and 53, and bottom 54. Bottom guide frame 50 is generally similar to top guide frame 30. Thus, top portion 51 of the bottom guide frame is apertured to accommodate rod 36. Resting against the bottom surface of portion 51 is dished washer 57, maintained in position by nut 58 engaging the threaded end of rod 36.

Coil spring 56 need not be calibrated and serves to transmit the tensile stress to which the specimen is to be subjected. It will be evident that by adjusting the positions of the nuts at the two ends of rod 36, any desired degree of compression in the two springs may be provided. The compression of the two springs when the frames are in the position shown in Figures 1, 2 and 3, is taken up completely by rod 36 so that no tension outside of the two guide frames is provided.

Figure 1:
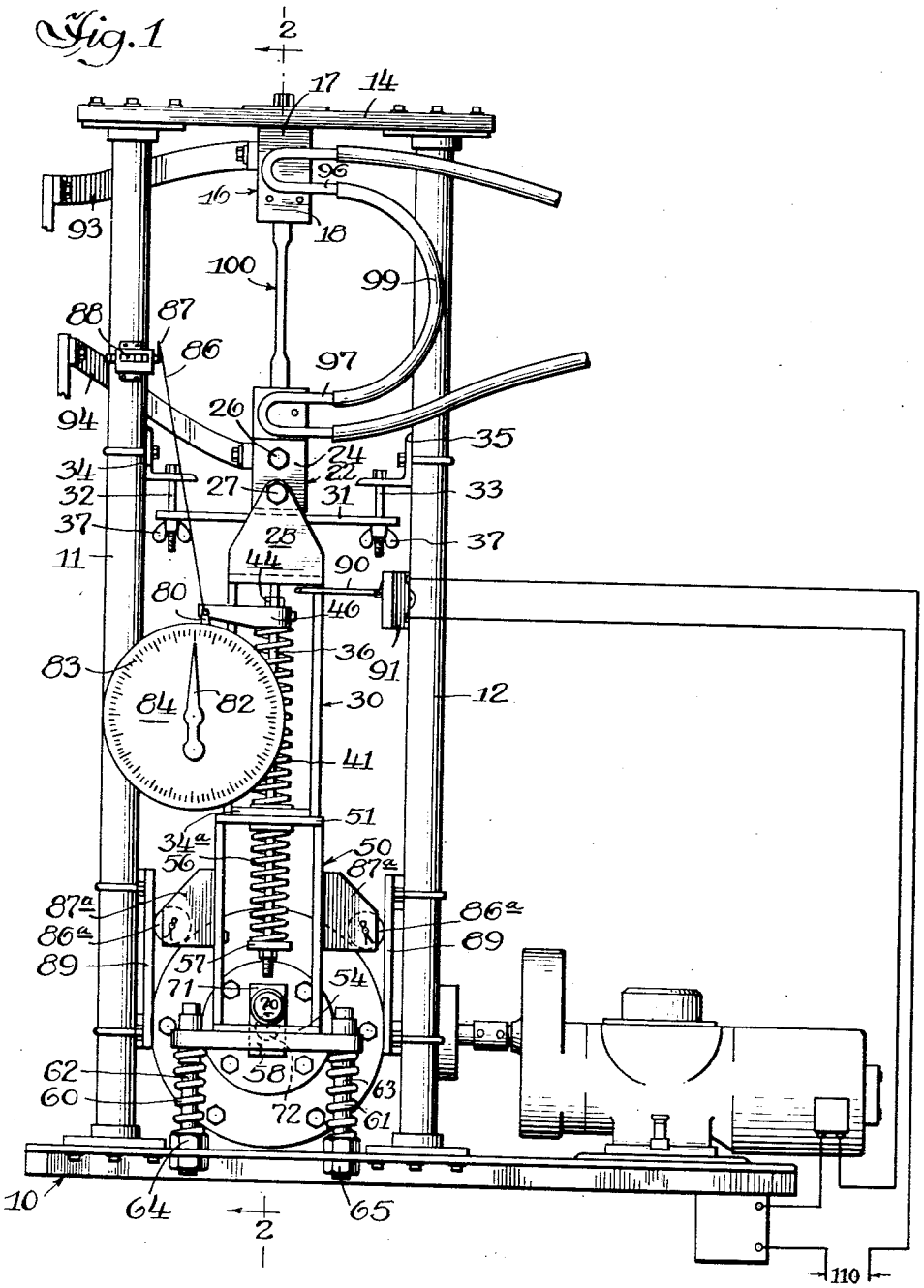
Figure 1 is a front elevation of a machine embodying the present invention.
Figure 2:
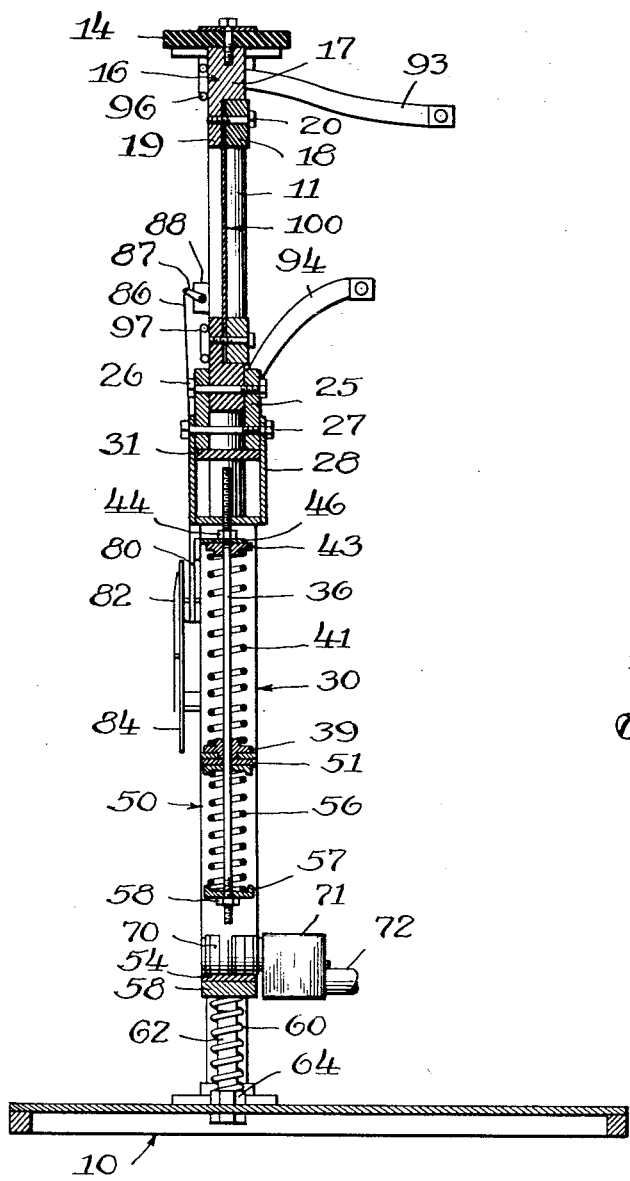
Figure 2 is a view along line 2—2 on Figure 1.
Figure 5:
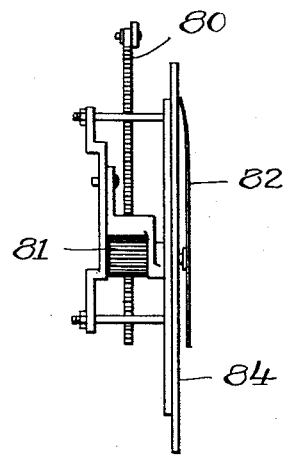
Figure 5 is a detail on line 5—5 of Figure 3 and illustrates the means for indicating the tension on a specimen.

Suitable means are provided for vertically reciprocating lower guide frame 50 from the position shown in Figures 1, 2 and 3. It is clear that if bottom guide frame 50 is pulled vertically downwardly, as seen in Figures 1 and 2, there will be a tendency to compress coil spring 56. The compression of coil spring 56 will communicate a tensile force upon rod 36 which will transmit this force through calibrated coil spring 41 to part 34 of the top guide frame. Yoke end 29 of top guide frame 30 will transmit this downward force to lower clamping block 22 and cause tension to be applied to the specimen on test.

The means for reciprocating the lower guide frame may consist of any suitable mechanism, the amplitude and frequency of the reciprocations being adjustable to suit desired testing conditions.

Disposed below bottom guide frame 50 is bar 58 resting against the bottom part 54 of the guide frame and urged upwardly by coil springs 60 and 61. Coil spring 60 and 61 are maintained in vertical position by guide bolts 62 and 63 carried by the base of the machine and passing through suitable apertures in bar 58. Nuts 64 and 65 above bar 58 determine the upward limit of travel of bar 58.

Engaging the top surface of part 54 of the lower guide frame is roller 70 carried by crank arm 71. Crank arm 71 is preferably adjustable so that the amplitude of vertical movement of the guide frame may be adjusted, within limits, to any desired value. Crank arm 71 is driven by shaft 72, and this shaft in turn is driven by any suitable source of power, such as an electric motor and suitable speed-reducing means. Shaft 72 may be driven at speeds of the order of about one revolution per minute to about fifteen revolutions per minute. However, the speed range may be above or below the figures given, depending upon the size of the testing machine, nature of specimens, and other factors.

Rotation of shaft 72 will cause crank arm 71 to turn and this will result in roller 70 pressing down upon lower part 54 of the frame and forcing the lower guide frame downwardly from the position shown in Figure 1. As shown in Figure 4, downward movement of the crank will cause the lower guide frame to be pulled downwardly away from the upper guide frame. Bar 58 will be kept tightly against the bottom of the lower frame. By virtue of the system of springs, it is clear that irrespective of whether the lower guide frame moves downwardly or upwardly, contact will be maintained between bottom part 54 of the lower guide frame and roller 70. It is understood, of course, that the rotation of the crank arm is slow enough so that the spring system will be able to follow the movements of the guide frame.

Means are provided for indicating the amount of tensile stress to which the specimen is subjected. Thus, referring to bracket 46, the free end thereof carries rack 80. Rack 80 extends vertically down and cooperates with pinion 81 coupled to pointer 82 playing over scale 83 on indicating plate 84. The free end of bracket 46 is also connected by elastic cord 86 to operating arm 87 of counter 88. Thus, every time that bracket 46 is pulled downwardly, counter 88 is actuated. It is also clear that when bracket 46 moves downwardly, the rack and pinion arrangement will cause pointer 82 to run over scale 83.

In order to maintain the path of travel of bottom guide frame 50 in a desired vertical line, rollers 86a carried by mounting plates 87a, supported on the frame, are provided. Rollers 86a cooperate with rails 88 rigidly supported on columns 11 and 12.

Means are provided to terminate the testing operation in case of failure of the specimen. Thus, arm 90 extends from one of the columns, such as column 12, for example, toward top guide frame 30 and normally is disposed just below the yoke portion of this guide frame. Arm 90 is coupled to switch 91, which controls the circuit for the motor for operating the testing machine. In case of failure of the specimen, lower clamping block 22 and the yoke attached thereto will drop. The amount of drop will be determined by the clearance between bar 31 and the bottom of the clamping block 22, and in any event, this clearance will be more than ample to permit the bottom of the yoke to drop arm 90 and trip the switch.

In case it is desired to heat the specimen and, assuming that the specimen is conducting, heavy conductors 93 and 94 are connected respectively to clamping blocks 16 and 22, these conductors being connected to a suitable source of current. Thus, the specimen under test may be heated to any desired temperature while it is being tested.

To prevent overheating of the clamping blocks for retaining the ends of the specimens, cooling pipes 96 and 97 are provided for the two clamping blocks. These pipes are connected by rubber hose 98, and the two pipes and hose may be supplied with suitable cooling fluid, such as oil or water.

Specimen 100, shown in Figure 1, consists of an elongated member. However, other specimens having different shapes may be used and it is understood that clamping blocks 16 and 22 may be supplied with suitable attachments to accommodate different specimens. It is possible, by suitable adjustment of coil springs 41, 56, 60 and 61, to have a compression force exerted upon a specimen when the mechanism is in the position shown in Figure 3. When the guide frames are separated as shown in Figure 4, the compression force upon the specimen may be reduced to zero or may even change to tension. Thus, it may be possible to test disc valves, diaphragms, expansible bellows, and various types of articles which are subject to fatigue conditions.

I claim:

1. A machine for testing a specimen under conditions inducing fatigue in said specimen, said machine comprising a base, means on said base for rigidly supporting one part of a specimen under test, a spring having calibrated elastic characteristics, means for supporting another part of a specimen, means coupling one end of said spring to said last named specimen-supporting means, a second spring, a rigid rod extending through both springs and secured at its opposite ends to one end of each of said springs, means for impressing a force upon the second spring to be transmitted successively to said rod, said first spring, and through said coupling means to said specimen, and indicating means coupled to said first spring for showing the amount of force applied to said first spring to be transmitted to said specimen.

2. In a machine for testing a specimen under conditions inducing fatigue, said machine comprising a base, spaced means carried by said base for supporting a specimen under test, a pair of relatively movable frames, coupling means including a calibrated spring for transmitting force between said two frames, means for attaching one of said frames to one specimen-supporting means, a spring mounted in the other of said frames, means for impressing a variable force on said second mentioned frame, means connected to said two springs for transmitting said force from said second mentioned frame through said second mentioned spring to said calibrated spring, said calibrated spring serving to transmit all the force to said first mentioned frame, and means coupled to said calibrated spring for indicating the amount of force transmitted by said spring.

3. A machine for testing a specimen under conditions inducing fatigue, said machine comprising a base, means on said base for supporting one part of a specimen, a pair of guide frames in axial alignment, a longitudinal rod passing through said frames, spring means coupling said rod to said frames, said frames, springs and rod together forming a force-transmitting path from one frame through said spring means and rod to the other frame whereby longitudinal force on one frame is transmitted to the other frame, said two frames being relatively movable to each other axially, means on one frame for supporting another part of said specimen, means for impressing a cyclically varying force upon the other frame to move the same axially through a range of movement, said one frame thereby having cyclic forces transmitted to it to be impressed upon said specimen, and means coupled to one of said spring means for indicating the spring response to the force transmitted by it, said spring being calibrated so that the force impressed upon said specimen is known.

4. The machine according to claim 3, wherein said one spring is a calibrated coil spring and wherein said means for indicating the response of said spring comprises means for indicating the change of length of said spring.

5. The machine according to claim 3, wherein means responsive to the movement of said one frame are provided for stopping the operation of said testing means whereby, upon failure of a specimen and consequent movement of said one frame, said means will operate to stop the machine.

6. The machine according to claim 3, wherein said means for supporting the parts of said specimen are of electrically conducting material and wherein current leads for said specimen-supporting means are provided so that said specimen may be heated during testing.

7. The machine according to claim 3, wherein the means for applying a cyclically varying force to the other frame includes a crank arm cooperating with said other frame.

References Cited in the file of this patent

UNITED STATES PATENTS

| Number | Name | Date |
|---|---|---|
| 902,497 | Landgraf et al. | Oct. 27, 1908 |
| 1,156,726 | Upton et al. | Oct. 12, 1915 |
| 1,409,842 | Foster | Mar. 14, 1922 |
| 1,695,046 | Hippensteel | Dec. 11, 1928 |
| 1,888,755 | Barr et al. | Nov. 22, 1932 |
| 1,907,907 | Varney | May 9, 1933 |